(12) United States Patent
Nagashima et al.

(10) Patent No.: US 6,205,104 B1
(45) Date of Patent: *Mar. 20, 2001

(54) RECORDING/REPRODUCING APPARATUS FOR COMPRESSED DATA

(75) Inventors: Hideki Nagashima; Ryo Ando; Yasuaki Maeda, all of Tokyo; Hideo Obata; Tadao Yoshida, both of Kanagawa; Kazuhiko Fujiie, Tokyo, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/129,029

(22) Filed: Sep. 29, 1993

Related U.S. Application Data

(63) Continuation of application No. 07/832,021, filed on Feb. 6, 1992, now abandoned.

(30) Foreign Application Priority Data

Feb. 8, 1991 (JP) .................................................. 3-060908

(51) Int. Cl.[7] .............................................. G11B 7/0045
(52) U.S. Cl. .......................................... 369/59.14; 369/84
(58) Field of Search ................................. 369/84, 13, 59, 369/124.06; 360/15, 32; 386/124

(56) References Cited

U.S. PATENT DOCUMENTS

| | | | |
|---|---|---|---|
| 4,768,110 | * 8/1988 | Dunlap et al. | 360/15 X |
| 4,775,897 | 10/1988 | Umemoto et al. | 358/311 |
| 4,799,677 | * 1/1989 | Frederiksen | 364/521 |
| 4,811,325 | * 3/1989 | Sharples, Jr. et al. | 360/15 |
| 5,128,910 | * 7/1992 | Iida | 369/13 |

FOREIGN PATENT DOCUMENTS

| | | | |
|---|---|---|---|
| 56-22231 | * 3/1981 | (JP) | 369/84 |
| 60-202573 | * 10/1985 | (JP) | 369/84 |
| 1-53385 | * 3/1989 | (JP) | 369/84 |

* cited by examiner

*Primary Examiner*—W. R. Young
(74) *Attorney, Agent, or Firm*—Limbach & Limbach L.L.P.; Seong-Kun Oh

(57) ABSTRACT

A high speed dubbing is to be realized with two recording and/or reproducing units for compressed data. To this end, a magneto-optical disc 32 is read by an optical head 33 and compressed data produced via a decoder 41 are delivered to a memory 14 via a switch 37. The data are then delivered to a magnetic head driving circuit 16 via an encoder 15 for direct writing on a magneto-optical disc 2. In this manner, compressed data are directly dubbed without expansion to realize high speed dubbing.

66 Claims, 5 Drawing Sheets

RECORDING/REPRODUCING APPARATUS FOR COMPRESSED DATA

This is a continuation application of application Ser. No. 07/832,021 filed on Feb. 6. 1992, now abandoned.

BACKGROUND OF THE INVENTION

This invention relates to a recording and/or reproducing apparatus for compressed data obtained on bit compression of digital audio signals. More particularly, it relates to a recording and/or reproducing apparatus in which at least a signal reproducing system and a signal recording system are provided separately from each other.

In e.g. JP Patent Applications Nos. 2-221364, 2-221365, 2-222821 and 2-222823, the present Assignee has proposed a technique of bit compressing input digital audio signals and recording them in a burst fashion based on a predetermined volume of data as a recording unit.

With this technique, AD (adaptive differential) PCM audio data prescribed in an audio data format of CD-ROM XA or CD-I (CD-Interactive) are recorded on or reproduced from a magneto-optical disc used as a recording medium in a burst fashion. Recording is made in this case with e.g. 32 sectors of the ADPCM data and several linking sectors as a recording unit for interleaving. Table 1 shows ADPCM audio levels in CD-I format or CD-ROM XA format in conjunction with standard CD (compact disc) format (CD-DA format).

TABLE 1

| | level | sampling frequency (kHz) | number of bits for quantization (bit) | dynamic range (db) | bandwidth (kHz) | playback time | | CD-I | CD-ROM XA |
|---|---|---|---|---|---|---|---|---|---|
| | | | | | | stereo | monaural | | |
| PCM | CDDA | 44.1 | 16 | 98 | 20 | 1 | — | ○ | ○ |
| AD | A | 37.8 | 8 | 90 | 17 | 2 | 4 | ○ | — |
| PCM | B | 37.8 | 4 | 90 | 17 | 4 | 8 | ○ | ○ |
| | C | 19.8 | 4 | 90 | 8.5 | 8 | 16 | ○ | ○ |

Referring to Table 1, in e.g. the level 8 mode, digital audio data are compressed to approximately ¼, such that the playback time of a disc recorded with the level B mode is four times that with a standard CD-DA format. This means that, since the recording/playback time about equal to that of a standard disc with a diameter of 12 cm may be achieved with a smaller size disc, the size of the recording and/or reproducing apparatus may be correspondingly reduced.

However, with the level B mode, for example, the four channel ADPCM data are presented cyclically at an interval of four sectors as the inherent recording data conforming to the CD-I format, so that, when a single channel is reproduced, it becomes necessary to take out one sector data out of four sector data periodically. However, it is practically impossible to effect recording of a channel of ADPCM data because of the problem of interleaving extending to adjoining channels. For this reason, with the above mentioned prior-art technology, continuous ADPCM audio data are time compressed at intervals of, for example, 32 sectors, and linking sectors are appended before and after the sector in order to take account of the interleaving extending to data of the adjoining sectors to effect sector-continuous recording in a burst fashion.

Meanwhile, a recording and/or reproducing apparatus, provided with two-channel recording and/or reproducing units, such as a so-called double-cassette tape recorder, has been offered to the market. It is highly probable that the demand will be raised for a recording and/or reproducing apparatus for compressed data which is provided with such two-channel recording and/or reproducing units. If these units were provided separately, production costs would be doubled. On the other hand, it is highly desirable that a so-called dubbing function be accorded to such apparatus provided with the two-channel recording and/or reproducing units so that a predetermined recording medium is reproduced by a reproducing system of one of the units for recording by a recording system of the remaining unit. If such dubbing function is to be implemented by the above mentioned recording and/or reproducing apparatus for compressed data, the same time that is necessary for usual playback is required for dubbing. Thus a function for dubbing at a higher speed is desired.

OBJECT AND SUMMARY OF THE INVENTION

In view of the above described status of the art, it is an object of the present invention to provide a recording and/or reproducing apparatus for compressed data in which at least a reproducing system for compressed data and a recording system for compressed data are provided, and in which signals reproduced from one of the recording media may be recorded in a reduced period of time on the other recording medium.

In accordance with the present invention, there is provided an apparatus for recording and/or reproducing compressed data comprising a reproducing system for compressed data for reproducing bit-compressed digital data from a recording medium, and a recording system for compressed data for recording the bit-compressed digital data in one other recording medium, wherein the compressed data from said reproducing system are transmitted to said recording system for direct recording on said other recording medium.

It is noted that, even when compressed data are read in a burst fashion or intermittently during ordinary reproduction on the basis of a predetermined data volume as a recording unit, the compressed data may be continuously read and transmitted to one other recording medium, that is, without expansion, for recording directly on the other recording medium.

Since the compressed data reproduced from a recording medium are directly recorded on the other recording medium, that is without expansion, so-called high-speed dubbing may be made in conformity to the compression factors.

It will be seen from above that, with the present recording and/or reproducing apparatus, digital data bit-compressed from one of the recording media are reproduced and directly recorded on the other medium, that is without bit expansion, so-called high-speed dubbing conforming to the compression factor may be achieved with high efficiency and in a short time.

DESCRIPTION OF THE PREFERRED EMBODIMENTS

Figure 1:
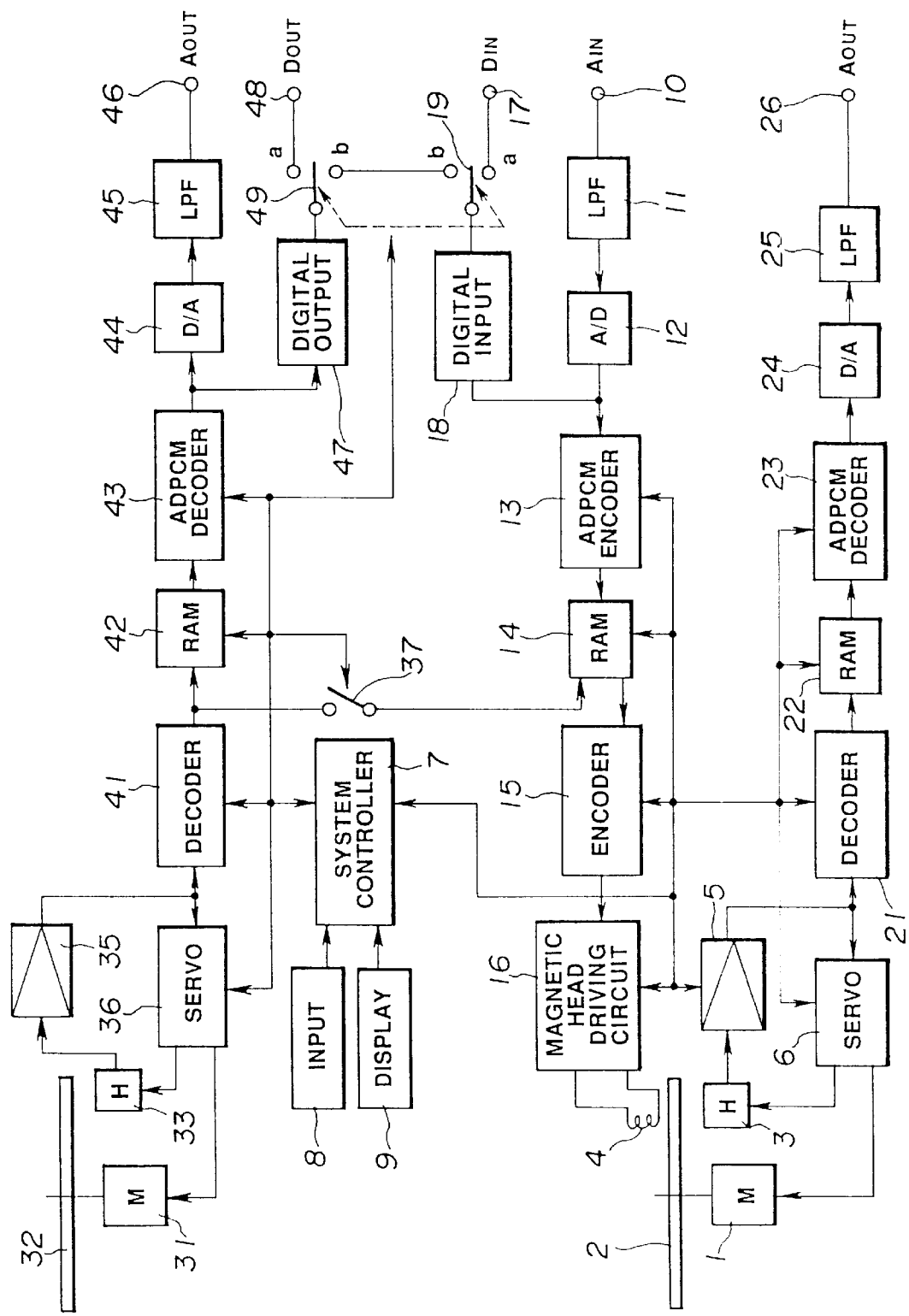
FIG. 1 is a block circuit diagram showing an arrangement of a disc recording and/or reproducing apparatus for compressed data according to an embodiment of the present invention.

FIG. 1 shows, in a block circuit diagram, a schematic arrangement of a disc recording and/or reproducing apparatus for compressed data according to the present invention.

The recording and/or reproducing apparatus shown in FIG. 1 is made up of a unit devoted to playback and a recording/reproducing unit which are combined to form one system. When signals reproduced from the reproducing system of the unit devoted to playback are recorded by the recording system of the recording and/or reproducing unit, by way of dubbing, compressed playback data (ADPCM audio data), read by an optical head 33 from a recording medium (magneto-optical disc 32) of the reproducing system and processed by a decoder 41 with 8-14 demodulation, deinterleaving and error correction, are transmitted via a switch 37 to the recording system of the recording and/or reproducing unit. The data are then transmitted from a memory 14 of the recording system to an encoder 15 where they are processed with error correction coding, interleaving and 8-14 modulation before being transmitted to a magnetic head driving circuit 16 for magnetic field modulation type photomagnetic recording for recording on the recording medium (magneto-optical disc 2). In this manner, the compressed data are transmitted to the recording system for recording on the magneto-optical disc 2 in a compressed state, that is in the state in which they are not as yet expanded by an ADPCM decoder 43.

Meanwhile, during ordinary playback for listening, compressed data are read from the recording medium (magneto-optical disc) intermittently, or in a burst fashion, with a predetermined data volume, such as 32 sectors plus several sectors, as a unit, so as to be expanded and converted into continuous audio signals. However, during the above mentioned so-called dubbing, the compressed data on the recording medium are continuously read and transmitted to the recording system for recording. In this manner, high-speed (or short-time) dubbing may be achieved as a function of the factor of data compression.

A non-limitative arrangement shown in FIG. 1 is hereinafter explained.

The disc recording and/or reproducing apparatus, shown in FIG. 1, is made up of a unit devoted to reproduction and a recording and/or reproducing unit, combined into one system. The reproducing unit is of substantially the same construction as the reproducing system of the recording and/or reproducing apparatus. In the recording and/or reproducing unit or the unit devoted to reproduction, the recording medium is a magneto-optical disc 2 or 32 rotationally driven by a spindle motor 1 or 31, respectively. During recording of data on the magneto-optical disc 2, a modulation magnetic field consistent with recording data is applied by a magnetic head 4, while the laser light is irradiated by the optical head 3 on the disc 2, by way of performing recording by magnetic field modulation, for recording data along the recording track(s) of the disc 2. During reproduction, the recorded data are reproduced photomagnetically by tracing the recording track of the disc 2 or 32 with a laser light radiated by the optical head 3 or 33.

In the following, explanation is made mainly of the recording and/or reproducing unit.

The optical head 3 is made up of a laser light source, such as a laser diode, optical components, such as a collimator lens, an object lens, a polarization beam splitter or a cylindrical lens, and a photodetector having a light receiving section of a predetermined pattern. The optical head 3 is provided for facing the magnetic head 4 with the magneto-optical disc 2 in-between. When recording data on the magneto-optical disc 2, the magnetic head 4 is driven by a head driving circuit 16 as later described for applying a modulation magnetic field consistent with the recording data, at the same time that a desired track on the disc 2 is irradiated with the laser light from the optical head 3, for effecting thermomagnetic recording in accordance with the magnetic field modulation system. The optical head 3 also detects the laser light irradiated on and reflected back from the target track, that is, it detects focusing errors and tracking errors by so-called astigmatic method and push-pull method, respectively. When reproducing data from the magneto-optical disc 2, the optical head 3 detects the focusing errors and tracking errors while simultaneously detecting the difference produced in the Kerr rotation angle of the reflected light from the target track for generating playback signals.

The output from the optical head 3 is supplied to an RF circuit 5 which extracts the focusing errors and tracking errors from the output of the optical head 3 to transmit the extracted signals to a servo control circuit 6, while rendering the playback signals into binary signals and transmitting the binary signals to a decoder 21 of a playback system which will be explained subsequently.

The servo control circuit 6 is made up of, for example, a focusing servo control circuit, a tracking servo control circuit, a spindle motor servo control circuit and a thread servo control circuit. The focusing servo control circuit controls focusing of an optical system of the optical head 3. The tracking servo control circuit controls tracking of an optical system of the optical head 3 so that the tracking error signal will be zero. The spindle motor servo control circuit controls a spindle motor 1 for rotationally driving the magneto-optical disc 2 at a predetermined rotational velocity, such as a constant linear velocity. The thread servo control circuit shifts the optical head 3 and the magnetic head 4 to a target track position on the magneto-optical disc 2 designated by a system controller 7. The servo control circuit 6 performing these various controlling operations transmits the information indicating the operating states controlled by the circuit 6 to the system controller 7.

A key input operating section 8 and a display section 9 are connected to the system controller 7. The system controller 7 controls the recording system and the reproducing system with an operating mode designated by the operating input information entered at the key input operating section 8. The system controller 7 also operates, on the basis of the sector-by-sector address information reproduced from the recording tracks of the magneto-optical disc 2 by subcode Q data or header time, for controlling the recording position or the playback position on the recording track traced by the optical head 3 and the magnetic head 4. Besides, the system controller 7 operates, on the basis of bit compression mode information in an ADPCM encoder 13 selected at the key input operating section 8 and bit compression mode information in playback data produced from the RF circuit 5 via a playback system as later described, for causing the bit compression mode to be displayed in the display section 9, while also operating, on the basis of the data compression factor and the playback position information on the recording track, for causing the playback time to be displayed in the display section 9.

For playback time display, the sector-by-sector address information (absolute time information) reproduced from the recording track of the magneto-optical disc 2 by the so-called header time or so-called subcode Q data is multiplied by a reciprocal of the data compression factor in the bit compression mode, which is equal to 4 for the data compression factor of ¼, to find the actual time information, which is displayed on the display section 9. Meanwhile, during recording, if the absolute time information is previously recorded, that is preformatted, on the recording track of e.g. the magneto-optical disc, the preformatted absolute time information may be read and multiplied by the reciprocal of the data compression factor for causing the current position to be displayed in terms of the actual recording time.

Turning to the recording system of the recording/reproducing unit of the disc recording and/or reproducing apparatus, an analog audio input signal $A_{IN}$ is supplied via a low-pass filter 11 to an A/D converter 12, which A/D converter quantizes the analog audio input signals $A_{IN}$. Digital audio signals from the A/D converter 12 are supplied to an adaptive (AD) PCM encoder 13. Digital audio input signals $D_{IN}$ from an input terminal 17 are supplied to the ADPCM encoder 13 via a digital input interface circuit 18. A changeover switch 19 is interposed between the input terminal 17 and the digital input interface circuit 18. The ADPCM encoder 13 is operated for processing the digital audio PCM data at the predetermined transfer rate, quantized from the input signals $A_{IN}$ by the A/D converter 12, by bit compression (data compression) associated with the various modes on the CD-I system shown in Table 1, and has its operating mode designated by the system controller 7. For example, in the level B mode shown in Table 1, the digital audio PCM data are processed into compressed data (ADPCM data) having the sampling frequency of 37.8 kHz and the number of bits per sample of 4, which compressed data are supplied to a memory 14. In the present level B stereo mode, the data transmission rate is lowered to one-fourth of the data transmission rate in the standard CD-DA format of 75 sectors/second, or to 18.75 sectors/second.

It is supposed-that, in the embodiment shown in FIG. 1, the sampling frequency of the A/D converter 12 is fixed to 44.1 kHz, which is the sampling frequency of the standard CD-DA format, and that, in the ADPCM encoder 13, bit compression from 16 bits to 4 bits is effected after conversion of the sampling rate conforming to the compression mode, for example, conversion from 44.1 kHz to 37.8 kHz for level B, has been made. Meanwhile, in a modification, the sampling frequency of the A/D converter 12 may be changed over depending on the prevailing compression mode, in which case the cut-off frequency is also changed over depending on the sampling frequency of the changed-over sampling frequency of the A/D converter 12. Thus it suffices if the sampling frequency of the A/D converter 12 and the cut-off frequency of the low-pass filter 11 are changed over simultaneously depending on the prevailing compression mode.

The memory 14, which has data read/write controlled by the system controller 7, is used as a buffer memory for transiently storing the ADPCM data supplied from the ADPCM encoder 13 for subsequent recording on the disc as the occasions may demand. That is, in the above mentioned level B stereo mode, the data transfer rate of the compressed audio data supplied from the ADPCM encoder 13 is reduced to one-fourth of the data transmitting rate of the standard CD-DA format of 75 sectors/second, or to 18.75 sectors/second. It is these compressed data that are written continuously in the memory 14. Although recording of one of four sectors of these compressed data (ADPCM data) suffices, as explained hereinabove, sector continuous recording as later explained is effectuated, because it is practically impossible to effect recording of every four sectors. This recording is effected in a burst fashion, by interposition of pause time, at the same data transfer rate as that for the standard CD-DA format, with a cluster consisting of a predetermined number of sectors, such as 32 plus several sectors, as a recording unit. That is, the level B stereo mode ADPCM audio data, continuously written at the low transmission rate of 75/4= 18.75 sectors/second, corresponding to the above mentioned bit compression rate, are read in the memory 14 as recording data in a burst fashion at the above mentioned transmission rate of 75 sectors/second. Although the total data transmission rate of these read recording data, inclusive of the recording pause period, is the above mentioned low rate of 18.75 sectors/second, the instantaneous data transmission rate within the time period of the recording operation, performed in a burst fashion, is the above mentioned standard 75 sectors/second. In this manner, when the rotational velocity of the disc is the same velocity as that of the standard CD-DA format (constant linear velocity), recording is performed at the same recording density and with the same recording pattern as those of the CD-DA format.

The ADPCM audio data, that is the recording data, read out in a burst fashion from memory 14 at the instantaneous transmission rate of 75 sectors/second, are supplied to an encoder 15. It is noted that, in a data string supplied from memory 14 to the encoder 15, it is a plurality of sectors, such as 32 sectors, plus a few sectors for cluster linking, arranged before and after the cluster, that are continuously recorded in one recording operation as a recording unit. These cluster linking sectors are selected to be longer than the interleaving length in the encoder 15 so that the data of the neighboring clusters are not affected by the interleaving operation. Details of the recording with the cluster as a recording unit will be explained later by referring to FIG. 2.

The recording data, supplied from memory 14 in the burst fashion as described above, are processed by the encoder 15 with encoding for error correction, that is, addition of parity data and interleaving, or EFM coding. The encoded recording data from encoder 15 are supplied to a magnetic head driving circuit 16 connected to a magnetic head 4. The magnetic head driving circuit 16 drives the magnetic head 4 so that a magnetic field modulated in accordance with the recording data are applied to the magneto-optical disc 2.

The system controller 7 effects memory control for memory 14 in the above described manner, while also effecting recording position control so that the recording data read out in a burst fashion from the memory 14 in the burst fashion will be continuously recorded on the recording track of the magneto-optical disc 2. The recording position control by the system controller 7 is so made that the recording position of the recording data read out in the burst fashion from memory 14 is supervised and control signals designating the recording position on the recording track of the magneto-optical disc 2 are transmitted to the servo control circuit 6.

The reproducing system of the recording/reproducing unit of the disc recording and/or reproducing apparatus is hereinafter explained.

This reproducing system is adapted for reproducing the recording data continuously recorded by the above mentioned recording system on the recording track of the magneto-optical disc 2, and is provided with a decoder 21 which is supplied with binary signals produced by processing at the RF circuit 5 of the playback output produced in turn by tracing the recording track of the magneto-optical disc 2 by the optical head 3.

The decoder 21 corresponds to the encoder 15 of the recording system and is operated for processing the binary playback output from the RF circuit 5 with decoding for error correction and EFM decoding. The decoder then is operated for reproducing the level B stereo mode ADPCM audio data at a transmission rate of 75 sectors/second which is faster than the regular transmission rate in the level B stereo mode. The reproduced data obtained from the decoder 21 are transmitted to a memory 22.

Data writing or readout in or from memory 22 is controlled by the system controller 7, so that reproduced data supplied from the decoder 21 at the transmission rate of 75 sectors/second are written in the memory 22 at the transmission rate of 75 sectors/second, while the reproduced data written in the burst fashion in the memory 22 at the transmission rate of 75 sectors/second are read out continuously at the regular transmission rate of 18.75 sectors/second for the level B stereo mode.

The system controller effects memory control for the memory 22 so that the reproduced data are written in the memory 22 at the transmission rate of 75 sectors/second and the reproduced data are continuously read from the memory 22 at the transmission rate of 75 sectors/second. The system controller 7 also effects control of the reproducing position so that the reproduced data read out in the burst fashion from memory 22 will be continuously reproduced from the recording track of the magneto-optical disc 2. Such control of the reproducing position is effected by controlling the reproducing position of the playback data, read out in a burst fashion from memory 22 by the system controller 7, for supplying control signals designating the reproducing position on the recording track of the magneto-optical disc 2 to the servo control circuit 6.

The level B stereo mode ADPCM audio data, obtained as the reproduced data read out continuously from memory 22 at the transmission rate of 18.75 sectors/second, are supplied to an ADPCM decoder 23. The ADPCM decoder 23 corresponds to the ADPCM encoder 13 of the recording system and has its operating mode designated by system controller 7 so that the level B stereo mode ADPCM data, for example, undergo data expansion (bit expansion) by a factor of four for reproducing 16-bit digital audio data. These digital audio data from the ADPCM decoder 23 are supplied to a D/A converter 24.

The D/A converter 24 is operated for converting the digital audio data from the ADPCM decoder 23 into analog signals to produce analog audio output signals $A_{OUT}$ which are outputted via a low-pass filter 25 at an output terminal 26.

The reproducing unit provided separately from the above described recording/reproducing unit is similar in construction to the reproducing system of the recording/reproducing unit. That is, a spindle motor 31, an optical head 33, an RF circuit 35 and a servo control circuit 36 correspond to the spindle motor 1, optical head 3, RF circuit 5 and to the servo control circuit 6, respectively, while the circuitry from a decoder 41 to a low-pass filter 45 corresponds to the circuitry from the decoder 21 to the low-pass filter 25. Since the detailed construction of these components is similar to that of the recording/reproducing unit, the corresponding description is omitted for simplicity. Meanwhile, the system controller 7, key input operating section 8 and the display section 9 for the recording/reproducing unit are simultaneously used for the reproducing unit for simplifying the arrangement and preventing excessive rise in production costs.

In the reproducing unit, the output from the decoder 41 is transmitted via a switch 37 to the memory 14 of the recording system of the recording/reproducing unit. The switch 37 is controlled by control signals from the system controller 7, so that, during so-called high-speed dubbing, compressed ADPCM data from decoder 41 are directly written in memory 14 without expansion and subsequently read so as to be transmitted to the encoder 15. Although the output from decoder 41 may in principle be transmitted to the encoder 15, it is more practical to effect buffering by memory 14 in view of the above mentioned linking appending operation.

The output from an ADPCM decoder 43 of the reproducing unit is transmitted via a digital interfacing circuit 47 to an output terminal 48 so as to be taken out as a digital output. A changeover switch 49 is interposed between the digital output interface circuit 47 and the output terminal 48 and has one of its fixed terminals a connected to the output terminal 48, while having its other fixed terminal b connected to a movable terminal b of the changeover switch 19 of the recording system of the recording/reproducing unit. These changeover switches 19, 49 are changed over in unison by control signals from system controller 7 and are changed over to the movable terminal b during dubbing by way of performing digital dubbing. However, on account of decoding and encoding of the ADPCM data, the dubbing speed is equal to the usual monitoring speed. It should be noted that the compression mode may be set separately at the reproducing side and at the recording side, so that, for example, a disc recorded with the level B mode may be reproduced for recording on another recording medium at a level C mode.

Meanwhile, the magneto-optical disc 2 employed in the above described disc recording and/or reproducing apparatus is preferably of such a capacity that stereo audio signals may be recorded thereon for 60 or more minutes up to about 74 minutes. Thus the memory capacity of the order of 130 M bytes is necessitated for the data compression factor of ¼ as in the case of the above mentioned B level. For a portable or pocketable size recording and/or reproducing apparatus, a disc with the outside diameter of 8 cm or less is preferably employed. As for the track pitch and the line speed, the track pitch of 1.6 μm and the line speed of 1.2 to 1.4 m/s, which are the same as those for the compact disc, are desired. For satisfying these conditions, an outside diameter of the disc of 64 mm, the outside diameter of a data recording region of 61 mm, an inside diameter of the data recording region of 32 mm, an inside diameter of a lead-in region of 30 mm and a diameter of a center hole of 10 mm, are preferred. If such disc is housed in a 70 mm×74 mm size disc caddy for marketing, it becomes possible to record and/or reproduce the disc by a recording and/or reproducing apparatus of a pocketable size. Meanwhile, the range of the inside and outside diameters of the data recording area of the disc which will enable recording and/or reproduction continuing for 72 to 76 minutes with the above mentioned ¼ data compression mode may be so set that the outside diameter of the data recording area for the inside diameters thereof of 32 mm and 50 mm is in the ranges of 60 to 62 mm and 71 to 73 mm, respectively.

The basic recording/reproducing operation by the above described disc recording and/or reproducing apparatus will be further explained in detail.

Figure 2:
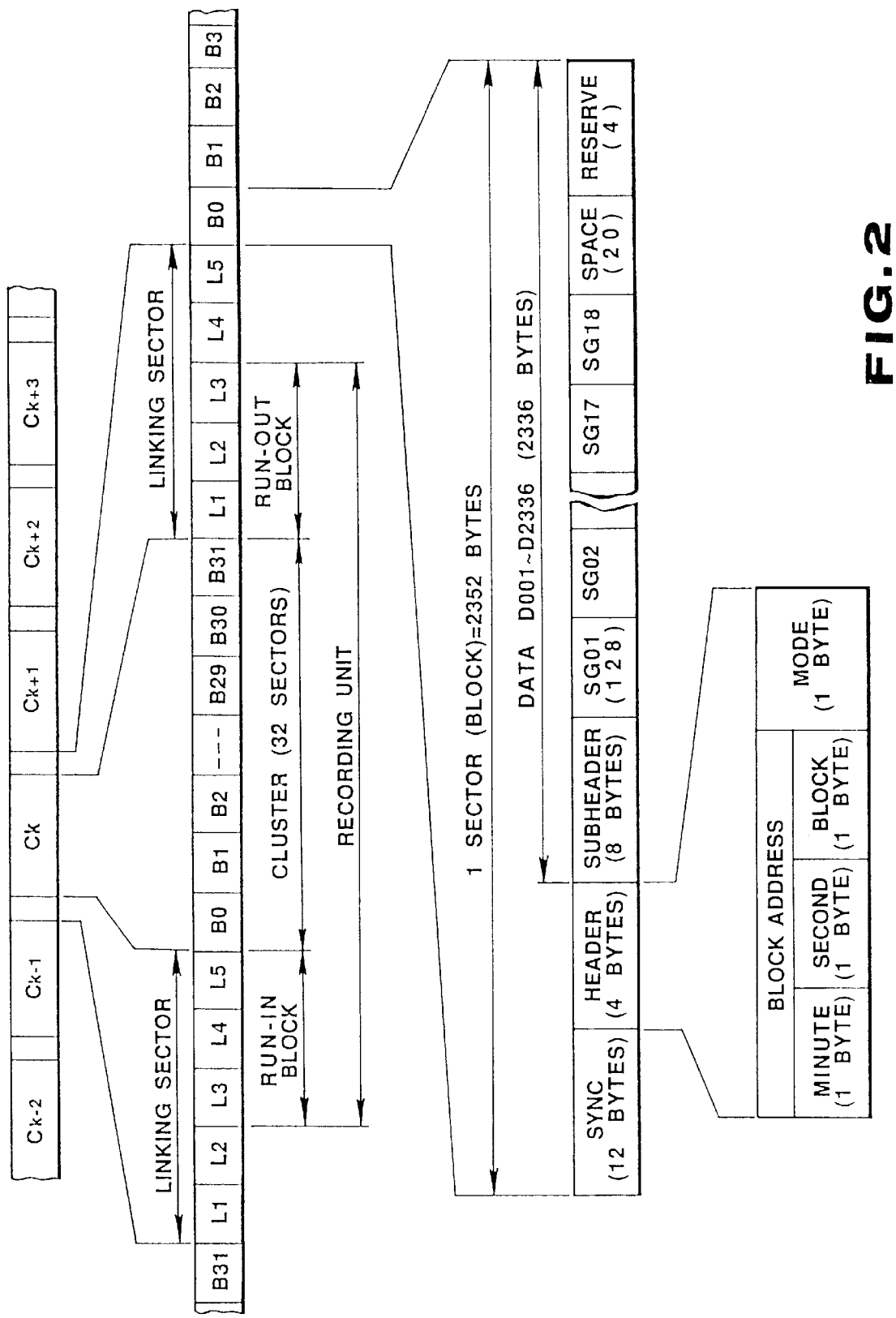
FIG. 2 is a diagrammatic view showing a format of a cluster structure which is to be a recording unit on a recording medium.

The recording data, i.e. data read out from memory 14, are divided into clusters each composed of a predetermined number of, for example, 32, sectors or blocks. A few sectors are arrayed between the adjoining clusters for interconnecting these clusters. Specifically, as shown in FIG. 2, each cluster C is composed of 32 sectors or blocks B0 to B31, and five linking sectors L1 to L5 are arrayed between these clusters C for linking to the adjoining clusters. It is noted that, when recording a cluster, such as a kth cluster $C_k$, the 32 sectors B0 to B31, 3 linking sectors before and after these sectors, that is three sectors L3 to L5 towards the cluster $C_{k-1}$, that is, run-in blocks, and three sectors L1 to L3 towards the cluster $C_{k+1}$, that is run-out blocks, totalling 38 sectors, are recorded as a unit. The 38-sector recording data are transmitted from the memory 14 to the encoder 15 where they are interleaved so that data of 108 frames at the maximum, corresponding to approximately 1.1 sector, are rearranged. The data within the cluster $C_k$ are included in the range of from the run-in blocks L3 to L5 to the run-out blocks L1 to L3 without affecting the neighboring clusters $C_{k-1}$ or $C_{k+1}$. Meanwhile, it is dummy data, such as 0s, that are arrayed in the linking sectors L1 to L5, so that the inherent data remain unaffected by interleaving. When the next cluster $C_{k+1}$ is recorded, since three sectors L3 to L5 of the five linking sectors L1 to L5 next to the cluster $C_k$ are used as the run-in blocks, the sector L3 is recorded in redundance, without, however, causing any inconvenience. Alternatively, each cluster may be made up of, for example, 38 sectors, inclusive of the linking sectors.

By such cluster-by-cluster recording, it becomes unnecessary to take account of interference with other clusters by interleaving, so that data processing may be simplified significantly. On the other hand, if recording data can not be recorded normally during recording, re-recording may be made on the cluster-by-cluster basis. If data can not be read effectively during data reproduction, re-reading may be made on the cluster-by-cluster basis.

Meanwhile, each sector or block consists of 2352 bytes, in which 12 synchronizing bytes, 4 header bytes and 2336 data bytes, which will prove to be data D0001 to D2336, are arrayed in this order from the leading end of the sector. Turning to the synchronizing 12 bytes of the sector or block construction, the first 1 byte is 00H, H indicating a hexadecimal number, followed by 10 bytes FFH and the last byte 00H. The next 4-byte header is made up of an address part consisting of a minute byte, a second byte and a block byte, followed by 1 byte for mode data. The mode data is used mainly for indicating the CD-ROM mode. The inner structure of a sector shown in FIG. 2 corresponds to the mode 2 of the CD-ROM format. The CD-I is a standard conforming to the mode 2.

FIG. 2 also shows a format for recording compressed audio data. Starting from the leading end of the 2336 bytes, 8-byte subheader data, 18 sound groups SG01 to SG18, each consisting of 128 bytes, a space area of 20 bytes, and a reserve area of 4 bytes, are arrayed in this order. The 8-byte subheader is composed of two repeated arrays of a file number, a channel number, a submode and a data type, each composed of 1 byte.

Figure 3:
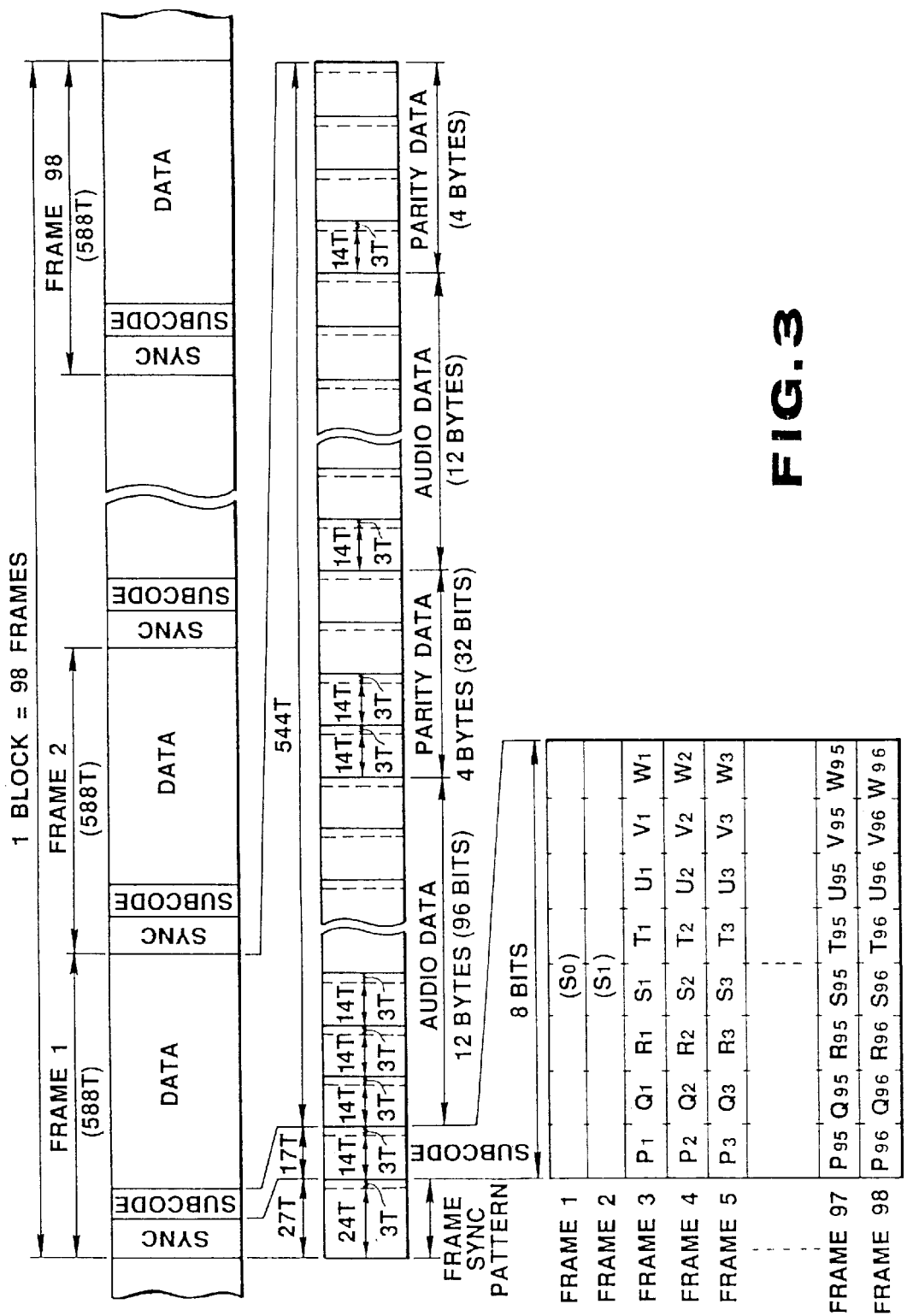
FIG. 3 is a diagrammatic view showing a format for a frame and a sector (block) in a CD standard.

Meanwhile, when data of the above mentioned sector construction are recorded on a disc, the data are processed by the encoder 15 by addition of parity data and encoding inclusive of interleaving as well as 8-14 modulation (EFM) before being recorded in accordance with the recording format shown in FIG. 3.

Referring to FIG. 3, each block or sector is composed of 98 frames from the first frame to the 98th frame. Each frame is 588 T, T being a channel clock period, and is constituted by a 24 T frame synchronizing pattern section (plus 3 T linking bits), a 14 T subcode section (plus 3 T linking bits) and a 544 T data section (audio data and parity data). The 544 T data section is composed of 12 byte (12 symbol) audio data, 4 byte parity data, 12 byte audio data and 4 byte parity data, processed by EFM, so that there are 24 byte audio data (or 12 word audio data because each word of the audio sample data is made up of 16 bits) in each frame. The subcode section is made up of 8-bit subcode data. processed by EFM, and is arranged in one block with 98 frames as a unit so that the eight bits of the 98 channels make up eight subcode channels P to W. The subcode sections of the first and second fames are block synchronizing patterns $S_0$, $S_1$ which violate the rule of EFM so that each of the subcode channels P t W is constituted by 96 bits from the third frame to the 98th frame.

Although the audio data are interleaved before recording, they are deinterleaved during reproduction so that the reproduced audio data are arrayed in the chronological sequence. Customary CD-I data may also be recorded in place of the audio data.

Meanwhile, in the disc recording and/or reproducing apparatus shown in FIG. 1, data similar to those of the above mentioned CD-DA format, that is the audio PCM data with the sampling frequency of 44.1 kHz, the number of quantization bits of 16 and a data transmission rate of 75 sectors/second, may be used as digital data produced from the A/D converter 12. If these data are transmitted to the ADPCM encoder 13 for bit compression in the level B stereo mode, the sampling rate is first converted to a sampling frequency of 37.8 kHz. The data are bit compressed with the number of quantization bits of 4 so that the compressed ADPCM data are outputted at a transmission rate of 18.75 sectors/second which is one-fourth of that of the input data. The level B stereo mode ADPCM audio data, continuously outputted from the ADPCM encoder 13 at the transmission rate of 18.75 sectors/second, are delivered to memory 14.

Figure 4:
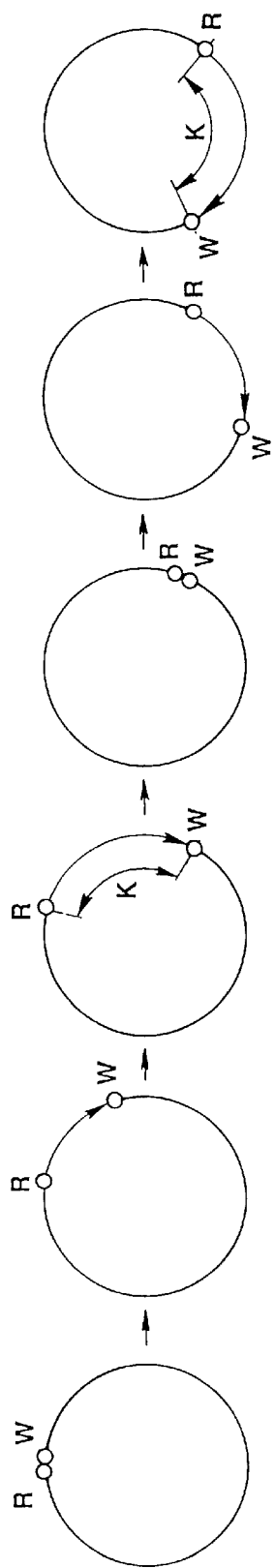
FIG. 4 is a schematic view showing the state of a memory in a recording system of the disc recording and/or reproducing apparatus shown in FIG. 1.

The system controller 7 controls the memory 14 so that, as shown in FIG. 4, a write pointer W of the memory 14 is continuously incremented at the transmission rate of 18.75 sectors/second for continuously writing the ADPCM audio data in the memory 14 at the transmission rate of 18.75 sectors/second and, when the data volume of the ADPCM audio data stored in the memory 14 exceeds a predetermined volume K, a read pointer R of the memory 14 is incremented in a burst fashion at the transmission rate of 75 sectors/second for reading the ADPCM audio data in a burst fashion as recording data from the memory 14 by the predetermined volume K.

In this manner, with the recording system of the disc recording and/or reproducing apparatus, shown in FIG. 1, the memory 14 is controlled by the system controller 7 so that the ADPCM audio data continuously outputted from the DPCM encoder 13 at the transmission rate of e.g. 18.75 sectors/second are written in the memory 14 at the above mentioned transmission rate of 18.75 sectors/second and, when the data volume of the ADPCM audio data stored in memory 14 exceeds a predetermined volume K, the ADPCM audio data are read from memory 14 as recording data in a burst fashion by the predetermined volume K so that the input data may be continuously written in the memory 14 while a data writing region in excess of the predetermined volume is maintained at all times in the memory 14. The recording position on the recording track of the magneto-optical disc 2 is controlled by the system controller 7 so that the recording data read out in a burst fashion from memory 14 may be continuously recorded on the recording track of the magneto-optical disc 2. In addition, since a data writing region in excess of a predetermined volume is maintained at all times in the memory 14 as described above, the input data may be continuously written in the data writing region in excess of the predetermined data volume, even although occurrence of track jump due to disturbances is detected by the system controller 7 and accordingly the recording operation on the magneto-optical disc 2 is interrupted, and the operation of restoration may be performed in the interim, so that the input data may be continuously recorded on the recording track of the magneto-optical disc 2.

Meanwhile, header time data corresponding to the physical address of the sector are recorded on the magneto-optical disc 2 by being appended to the ADPCM audio data on the sector-by-sector basis. Table-of-contents data indicating the recording region and the recording mode are recorded in a table-of-contents region.

Figure 5:
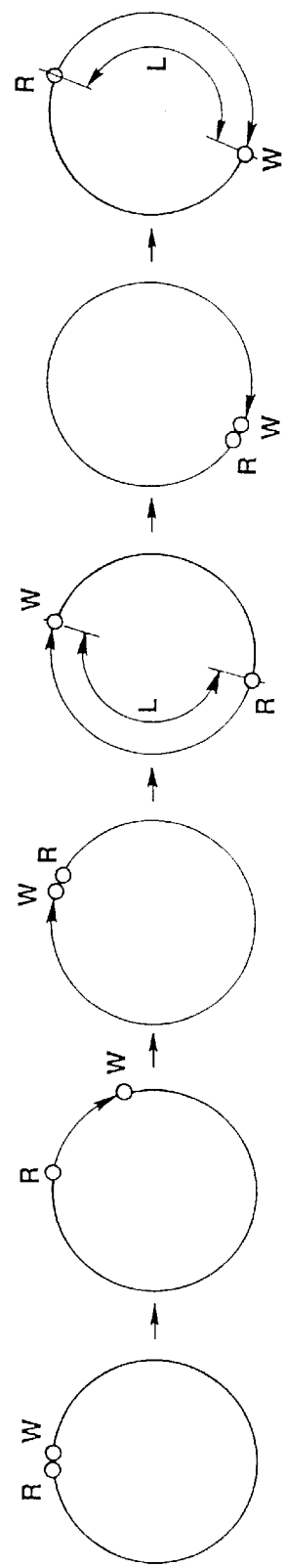
FIG. 5 is a schematic view showing the state of a memory in a reproducing system of the disc recording and/or reproducing apparatus shown in FIG. 1.

In the reproducing system of the disc recording and/or reproducing apparatus, shown in FIG. 1, the memory 22 is controlled by the system controller 7 so that, as shown in FIG. 5, a write pointer W of the memory 22 is incremented at a transmission rate of 75 sectors/second for writing playback data in the memory 22 at the transmission rate of 75 sectors/second, while a read pointer R of the memory 22 is continuously incremented at a transmission rate of 18.75 sectors/second for continuously reading the playback data from memory 22 at the transmission rate of 18.75 sectors/second, so that writing is discontinued when the read pointer R is overtaken by the write pointer W. The write pointer W of the memory 22 is incremented in a burst fashion at the transmission rate of 75 sectors/second so that writing is effected when the data volume of the playback data stored in memory 22 becomes less than a predetermined volume L.

With the above described reproducing system of the disc recording and/or reproducing apparatus, the memory 22 is controlled by the system controller 7 so that the level B stereo mode ADPCM audio data, reproduced from the recording track of the magneto-optical disc 2, are written in a burst fashion in the memory 22 at the transmission rate of 75 sectors/second, while the ADPCM audio data are read continuously from memory 22 as playback data at the transmission rate of 75 sectors/second, so that the playback data may be continuously read from memory 22 while the data readout region in excess of the predetermined volume L is maintained at all times in the memory 22. On the other hand, the playback data read out in a burst fashion from memory 22 may be continuously reproduced from the recording track of the magneto-optical disc 2 by controlling the playback position on the recording track of the magneto-optical disc 2 by the system controller 7. In addition, since a data readout region in excess of a predetermined volume L is maintained at all times in the memory 22, if the occurrence of track jumps due to disturbances or the like is detected by the system controller 7 to interrupt the playback operation for the magneto-optical disc 2, playback data may be continuously read from the data readout region in excess of the predetermined volume L to continue the outputting of the analog audio signals, and the operation of restoration may be effected in the interim.

The high-speed dubbing and the ordinary speed digital dubbing are hereinafter explained.

Figure 6:
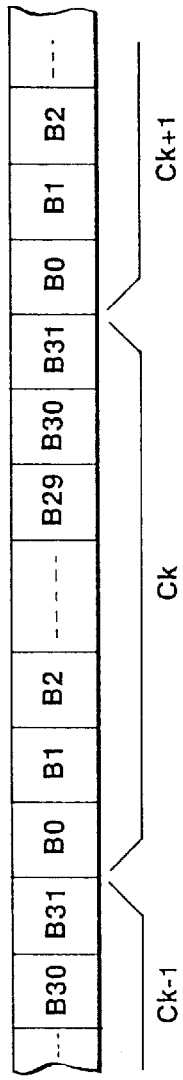
FIG. 6 is a diagrammatic view showing the state of sector array data in which a linking sector is removed on decoding for connection with neighboring clusters.

During the high-speed digital dubbing, a dubbing operating key of the key input operating section 8 is operated to effect predetermined high speed dubbing under control of the system controller 7. Specifically, the switch 37 is turned on and the recording data on the magneto-optical disc 32 are continuously read by the optical head 33 of the reproducing unit. Since the rotational speed of the disc is the same as that for standard speed reproduction, a quadrupled volume of the compressed data are continuously read if the level B stereo mode ADPCM data, for example, are recorded on the magneto-optical disc 32. The compressed data (ADPCM audio data) having sector arrays free of linking sectors as shown in FIG. 6 are produced from decoder 41 and delivered to the memory 14 of the recording/reproducing unit. When the data volume reaches a predetermined volume, the data are read from the memory 14 and delivered to the encoder 15 and linking sectors are appended to the data before being recorded on the magneto-optical disc 2.

Figure 7:
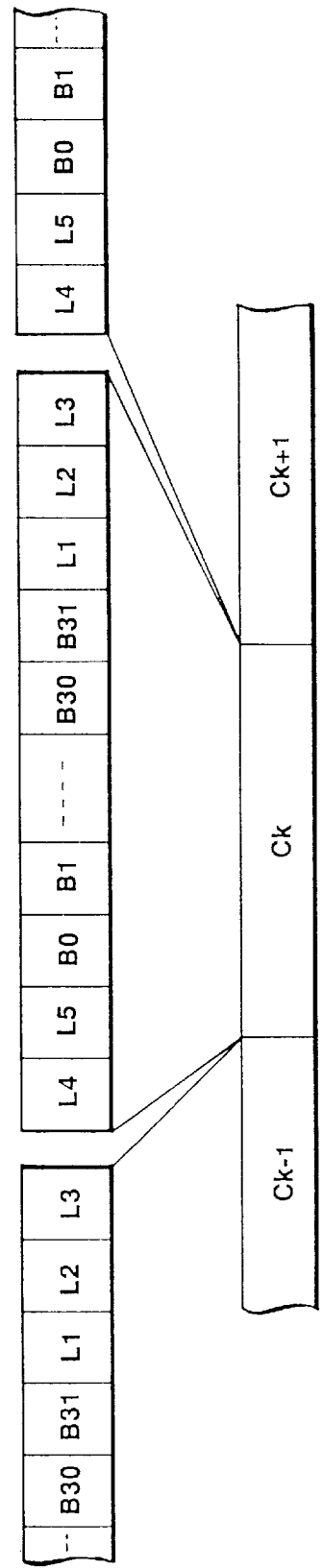
FIG. 7 is a diagrammatic view showing the state of sector array of recorded data during so-called high-speed dubbing.

During the above mentioned ordinary recording, the compressed data are recorded intermittently, so that three linking sectors are added before and after each cluster (composed of 32 sectors) so that a sector is overlapped with the end linking sector of the cluster next to be recorded. However, since continuous recording is effected during high-speed dubbing, two leading side sectors and three trailing side sectors are appended in the case of high-speed dubbing, as shown in FIG. 7, so that the sum total of 37 sectors are recorded as a recording unit. Thus, although it is required of the servo system to read address data such as header time or to effect track jump during starting, it is sufficient, once the recording is started, if recording is sequentially continued until the recording is terminated to maintain the state of recording.

When monitoring the audio data during high-speed dubbing, one of four contiguous clusters may be transmitted from decoder 41 to the memory 42 and thence to the ADPCM decoder 43 to produce audio signals at a quadrupled speed at the output terminal 46 for monitoring.

In this manner, during the high speed dubbing, compressed data corresponding to quadrupled time duration on the real time basis are continuously produced from the magneto-optical disc 32 in the case of the level B stereo mode so as to be directly recorded on the magneto-optical disc 2, so that high speed dubbing at the quadrupled speed is realized. Meanwhile, the multiplication factor of the dubbing speed may naturally be changed with different compression modes.

During normal speed digital dubbing, the changeover switches 19, 49 are changed over to the movable contacts b, under control of the system controller 7, so that digital audio data obtained from ADPCM decoder 43 via digital output interface circuit 47 are transmitted to the ADPCM decoder 13 via digital input interface circuit 18. Although the same time period is necessitated in this case for dubbing as that for actual performance, the sound quality is not deteriorated because the audio signals are digital signals, while different compression modes may be advantageously employed by the reproducing side and by the recording side. The optical discs having the so-called CD-I or CD-ROM XA recording formats may also be dubbed.

It is to be noted that the present invention is not limited to the above described embodiments. For example, two recording/reproducing units or a combination of a unit devoted to playback and a unit devoted to recording may be used in place of a combination of the unit devoted to playback and the recording/reproducing unit. Although the recording/reproduction of the level B stereo or monaural mode compressed data of the so-called CD-I system or the CD-ROM XA system by the disc recording and/or reproducing apparatus has been explained above, audio data bit-compressed by other modes or systems may also be recorded and/or reproduced in the similar manner. Each cluster may also be made up of a number of sectors different from 32, such as 64 sectors. The recording disc may also be a phase transition type optical disc, an organic colorant based optical disc or a photochemical hole burning (PHB) optical disc, in place of the magneto-optical disc. The disc-shaped recording medium may also be replaced by a card-shaped or tape-shaped recording medium.

What is claimed is:

1. An apparatus for recording and reproducing compressed data, comprising:
    a reproducing only system for reproducing bit-compressed digital data from a first recording medium, the reproducing only system including:
        a first optical head for reading the bit-compressed data from the first recording medium and producing a corresponding first output signal, and
        a decoder supplied with the first output signal for decoding, demodulating, and deinterleaving the bit-compressed data reproduced by the first optical head and producing a corresponding second output signal of bit compressed data; and
    a recording and reproducing system for recording bit-compressed digital data onto a second recording medium and reproducing bit-compressed digital data from the second recording medium, the recording and reproducing system including:
        a random access memory (RAM) selectively supplied with either the second output signal or encoded, bit compressed input data,
        an encoder for reading out bit compressed data from the RAM and error correction encoding, interleaving, and modulating the bit compressed data read out of the RAM to produce a corresponding third output signal, and
        a magnetic head supplied with the third output signal for photomagnetically recording the third output signal on the second recording medium, whereby the compressed data from said reproducing only system can be transmitted to said recording and reproducing system for direct recording on said second recording medium without being expanded and recompressed;
    wherein, the reproducing only system and the recording and reproducing system are combined as a single unit; and further
    wherein said single unit is configured to perform a high speed and a standard speed digital dubbing operations such that during the high speed digital dubbing operation, said first optical head is configured continuously read said bit-compressed data from said first recording medium, and during the standard speed digital dubbing operation, said compressed data are recorded on said second recording medium intermittently.

2. The apparatus of claim 1 wherein said reproducing only system, during a reproduction of the compressed data for listening by a user, reads said compressed data from said first recording medium in a burst fashion, with a predetermined data volume as a unit, and further includes a first decompression unit supplied with the compressed data read in a burst fashion for expanding the compressed data and converting it into continuous audio signals.

3. The apparatus of claim 2 wherein said recording and reproducing system, during a reproduction of compressed data from the second recording medium for listening by a user, reads said compressed data from said second recording medium in a burst fashion, with a predetermined data volume as a unit, and further includes a second decompression unit supplied with the compressed data read in a burst fashion for expanding the compressed data and converting it into continuous audio signals.

4. The apparatus of claim 1 wherein the second recording medium is a magneto-optical recording medium.

5. The apparatus of claim 1 wherein the recording and reproducing system includes a second optical head for reading and/or reproducing data from said second recording medium.

6. The apparatus of claim 5 wherein said second optical head is configured to detect focusing errors and tracking errors.

7. The apparatus of claim 1 further including a controller for providing control signals to said reproducing only system and said recording and reproducing system.

8. The apparatus of claim 7 further including an input operating section coupled to the controller for designating an operating mode.

9. The apparatus of claim 8 wherein said controller controls said reproducing only system and said recording and reproducing system in accordance with said operating mode.

10. The apparatus of claim 8 wherein said operating mode includes a bit compression mode.

11. The apparatus of claim 7 further including a display coupled to the controller for displaying system operation information.

12. The apparatus of claim 11 wherein said system operation information includes one or more of bit compression mode information, playback position information and playback time information.

13. An integrated compressed data dubbing apparatus, comprising:
    a reproduction-only unit for reproducing bit-compressed digital data from a first recording medium, the reproduction-only unit including:
        a first optical head for reading the bit-compressed data from the first recording medium and producing a corresponding first output signal, and
        a decoder supplied with the first output signal for decoding, demodulating, and deinterleaving the bit-compressed data reproduced by the first optical head and producing a corresponding second output signal of bit compressed data; and
    a recording and reproducing unit for recording bit-compressed digital data onto a second recording medium and reproducing bit-compressed digital data from the second recording medium, the recording and reproducing unit including:
        a buffer memory,
        an encoder for reading out bit compressed data from the memory and error correction encoding, interleaving, and modulating the bit compressed data read out of the memory to produce a corresponding third output signal, and a magnetic head supplied with the third output signal for recording the third output signal on the second recording medium, whereby the compressed data from said reproducing only system can be transmitted to said recording and reproducing system for direct recording on said second recording medium without being expanded and recompressed;

wherein said data dubbing apparatus is configured to perform a high speed and a standard speed digital dubbing operations such that during the high speed digital dubbing operation, said first optical head is configured continuously read said bit-compressed data from said first recording medium, and during the standard speed digital dubbing operation, said compressed data are recorded on said second recording medium intermittently.

14. The apparatus of claim 13 wherein said buffer memory is a random access memory.

15. The apparatus of claim 14 wherein said random access memory is selectively supplied with either the second output signal or encoded, bit compressed input data.

16. The apparatus of claim 13 wherein said reproduction-only unit, during a reproduction of the compressed data for listening by a user, reads said compressed data from said first recording medium in a burst fashion, with a predetermined data volume as a unit, and further includes a first decompression unit supplied with the compressed data read in a burst fashion for expanding the compressed data and converting it into continuous audio signals.

17. The apparatus of claim 16 wherein said recording and reproducing unit, during a reproduction of compressed data from the second recording medium for listening by a user, reads said compressed data from said second recording medium in a burst fashion, with a predetermined data volume as a unit, and further includes a second decompression unit supplied with the compressed data read in a burst fashion for expanding the compressed data and converting it into continuous audio signals.

18. The apparatus of claim 13 wherein the second recording medium is a magneto-optical recording medium.

19. The apparatus of claim 13 wherein the recording and reproducing unit includes a second optical head for reading and/or reproducing data from said second recording medium.

20. The apparatus of claim 19 wherein said second optical head is configured to detect focusing errors and tracking errors.

21. The apparatus of claim 13 further including a controller for providing control signals to said reproducing only system and said recording and reproducing unit.

22. The apparatus of claim 21 further including an input operating section coupled to the controller for designating an operating mode.

23. The apparatus of claim 22 wherein said controller controls said reproducing only unit and said recording and reproducing unit in accordance with said operating mode.

24. The apparatus of claim 22 wherein said operating mode includes a bit compression mode.

25. The apparatus of claim 21 further including a display coupled to the controller for displaying system operation information.

26. The apparatus of claim 25 wherein said system operation information includes one or more of bit compression mode information, playback position information and playback time information.

27. A method for recording and reproducing compressed data, comprising the steps of:

reproducing bit-compressed digital data from a first recording medium, the step of reproducing includes the steps of:
reading the bit-compressed data from the first recording medium and producing a corresponding first output signal, and
receiving said first output signal for decoding, demodulating, and deinterleaving the bit-compressed data reproduced by the first optical head and producing a corresponding second output signal of bit compressed data; and recording and reproducing step for recording bit-compressed digital data onto a second recording medium and reproducing bit-compressed digital data from the second recording medium, the step of recording including the steps of:
selectively storing the second output signal or encoded, bit compressed input data,
reading out the stored bit compressed data and error correction encoding, interleaving, and modulating the bit compressed data read out to produce a corresponding third output signal, and
photomagnetically recording the third output signal on the second recording medium such that the compressed data from said step of recording and reproducing is directly recorded on said second recording medium without being expanded and recompressed;

wherein said method is configured to perform a high speed and a standard speed digital dubbing operations such that during the high speed digital dubbing operation, said step of reproducing bit-compressed digital data from said first recording medium includes the step of continuously reading said bit-compressed data from said first recording medium and during the standard speed digital dubbing operation said compressed data are recorded on said second recording medium intermittently.

28. The method of claim 27 wherein during a reproduction of the compressed data for listening by a user, said step of reproducing includes the step of reading said compressed data from said first recording medium in a burst fashion with a predetermined data volume as a unit, said method further including the step of expanding the compressed data and converting it into continuous audio signals.

29. The method of claim 28 wherein during a reproduction of compressed data from the second recording medium for listening by a user, said step of recording and reproducing includes the step of reading said compressed data from said second recording medium in a burst fashion with a predetermined data volume as a unit, said method further including the step of expanding the compressed data and converting it into continuous audio signals.

30. The method of claim 27 wherein the second recording medium is a magneto-optical recording medium.

31. The method of claim 27 wherein the step of recording and reproducing includes the step of reading and/or reproducing data from said second recording medium.

32. The method of claim 31 wherein said step of recording and/or reproducing data includes the step of detecting focusing errors and tracking errors.

33. The method of claim 27 further including the step of generating control signals for recording and reproducing compressed data.

34. The method of claim 33 further including the step of designating an operating mode in accordance with said control signals.

35. The method of claim 34 wherein said operating mode includes a bit compression mode.

36. The method of claim 33 further including the step of displaying system operation information.

37. The method of claim 36 wherein said system operation information includes one or more of bit compression mode information, playback position information and playback time information.

38. A method of providing integrated compressed data dubbing, comprising the steps of:

reproducing bit-compressed digital data from a first recording medium, the step of reproducing including the steps of:

reading the bit-compressed data from the first recording medium and producing a corresponding first output signal, and for decoding, demodulating, and deinterleaving the bit-compressed data reproduced by the first optical head and producing a corresponding second output signal of bit compressed data; and recording and reproducing step for recording bit-compressed digital data onto a second recording medium and reproducing bit-compressed digital data from the second recording medium, the recording and reproducing step including the steps of:

reading out bit compressed data from a buffer memory and error correction encoding, interleaving, and modulating the bit compressed data read out of the memory to produce a corresponding third output signal, and recording the third output signal on the second recording medium, whereby the compressed data from said reproducing only system can be transmitted to said recording and reproducing system for direct recording on said second recording medium without being expanded and recompressed;

wherein said dubbing method is configured to perform a high speed and a standard speed digital dubbing operations such that during the high speed digital dubbing operation, said step of reading the bit-compressed data from said first recording medium includes the step of continuously reading said bit-compressed data from said first recording medium, and during the standard speed digital dubbing operation, said compressed data are recorded on said second recording medium intermittently.

39. The method of claim 38 wherein said buffer memory is a random access memory.

40. The method of claim 39 further including the step of selectively supplying said random access memory with either the second output signal or encoded, bit compressed input data.

41. The method of claim 38 wherein during a reproduction of the compressed data for listening by a user, said step of reproduction includes the step of reading said compressed data from said first recording medium in a burst fashion, with a predetermined data volume as a unit, said method further including the step expanding the compressed data and converting it into continuous audio signals.

42. The method of claim 41 wherein during a reproduction of compressed data from the second recording medium for listening by a user, said step of recording and reproducing includes the step of reading said compressed data from said second recording medium in a burst fashion, with a predetermined data volume as a unit, said method further including the step of expanding the compressed data and converting it into continuous audio signals.

43. The method of claim 38 wherein the second recording medium is a magneto-optical recording medium.

44. The method of claim 38 wherein the recording and reproducing step includes the step of reading and/or reproducing data from said second recording medium.

45. The method of claim 44 wherein said step of reading and/or reproducing data from said second recording medium includes the step of detecting focusing errors and tracking errors.

46. The method of claim 38 further including the step of generating control signals for controlling compressed data recording and reproducing.

47. The method of claim 46 further including the step of designating an operating mode in accordance with said control signals.

48. The method of claim 47 wherein said operating mode includes a bit compression mode.

49. The method of claim 38 further including the step of displaying system operation information.

50. The method of claim 49 wherein said system operation information includes one or more of bit compression mode information, playback position information and playback time information.

51. A single apparatus, comprising:

reproduce-only means for selectively either reproducing compressed digital signals from a first medium to produce continuous audio signals for listening by a user or continuously reproducing the compressed digital signals from the first medium and outputting them; and recording and reproducing means for selectively recording compressed digital signals onto a second medium, reproducing compressed digital signals from the second medium and converting the reproduced signals into continuous audio signals for listening by a user, and, alternatively, recording onto the second medium the compressed digital signals output from the reproduce-only means without first decompressing them;

wherein said single apparatus is configured to perform a high speed and a standard speed digital dubbing operations such that during the high speed digital dubbing operation, said reproduce-only means is configured continuously read said bit-compressed data from said first medium, and during the standard speed digital dubbing operation, said compressed data are recorded on said second medium intermittently.

52. The apparatus of claim 51 wherein the second medium is a magneto-optical recording medium.

53. The apparatus of claim 51 further including control means for providing control signals to said reproduce-only means and said recording and reproducing means.

54. The apparatus of claim 53 further including input means for designating an operating mode.

55. The apparatus of claim 54 wherein said control means controls said reproduce-only means and said recording and reproducing means in accordance with said operating mode.

56. The apparatus of claim 54 wherein said operating mode includes a bit compression mode.

57. The apparatus of claim 53 further including display means for displaying operation information.

58. The apparatus of claim 57 wherein said operation information includes one or more of bit compression mode information, playback position information and playback time information.

59. A method of providing an integrated apparatus, comprising the steps of:

selectively either reproducing compressed digital signals from a first medium to produce continuous audio signals for listening by a user or continuously reproducing the compressed digital signals from the first medium and outputting them; and selectively recording compressed digital signals onto a second medium, reproducing compressed digital signals from the second medium and converting the reproduced signals into continuous audio signals for listening by a user, and, alternatively, recording onto the second medium the compressed digital signals output without first decompressing them;

wherein said method is configured to perform a high speed and a standard speed digital dubbing operations such that during the high speed digital dubbing operation, said compressed digital signals are continuously reproduced from said first medium, and during the standard speed digital dubbing operation, said compressed digital signals are recorded on said second medium intermittently.

60. The method of claim 59 wherein the second medium is a magneto-optical recording medium.

61. The method of claim 59 further including the step of generating control signals for controlling said steps of selectively either reproducing or continuously reproducing and of selectively recording reproducing and recording.

62. The method of claim 59 further including the step of designating an operating mode.

63. The method of claim 62 wherein said operating mode includes a bit compression mode.

64. The method of claim 59 further including the step of displaying operation information.

65. The method of claim 64 wherein said operation information includes one or more of bit compression mode information, playback position information and playback time information.

66. A method of digitally dubbing compressed data, comprising the steps of:

selectively either reproducing compressed digital signals from a first medium to produce continuous audio signals for listening by a user or continuously reproducing the compressed digital signals from the first medium and outputting the compressed digital signals;

receiving digital audio signals from a source, bit compressing the digital audio signals and recording the outputted compressed digital signals onto a second medium; after said step of receiving bit compressing and recording, recording onto the second medium the bit compressed digital signals without first decompressing them to thereby dub said digital signals; and after said step of recording onto the second medium, selectively reproducing bit compressed digital signals from the second medium and converting the reproduced bit compressed digital signals into continuous audio signals for listening by a user;

wherein said dubbing method is configured to perform a high speed and a standard speed digital dubbing operations such that during the high speed digital dubbing operation, said compressed digital signals are continuously reproduced from said first medium, and during the standard speed digital dubbing operation, said bit compressed digital signals are recorded on said second medium intermittently.

* * * * *